United States Patent
Kim et al.

(10) Patent No.: US 9,939,937 B2
(45) Date of Patent: Apr. 10, 2018

(54) APPARATUS AND METHOD FOR DISPLAYING INFORMATION IN A PORTABLE TERMINAL DEVICE

(71) Applicant: Samsung Electronics Co., Ltd., Gyeonggi-do (KR)

(72) Inventors: Yusic Kim, Gyeonggi-do (KR); Kyunghoon Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 10 days.

(21) Appl. No.: 14/054,256

(22) Filed: Oct. 15, 2013

(65) Prior Publication Data

US 2014/0104210 A1 Apr. 17, 2014

(30) Foreign Application Priority Data

Oct. 15, 2012 (KR) .................. 10-2012-0114315

(51) Int. Cl.
| | | |
|---|---|---|
| *G06F 3/041* | (2006.01) | |
| *G06F 3/0488* | (2013.01) | |
| *G06F 3/0482* | (2013.01) | |

(52) U.S. Cl.
CPC .......... *G06F 3/0412* (2013.01); *G06F 3/0482* (2013.01); *G06F 3/0488* (2013.01)

(58) Field of Classification Search
CPC ....... G06F 3/041; G06F 3/0412; G06F 3/0416
USPC .......................... 345/173, 174; 715/702, 863
See application file for complete search history.

(56) References Cited

U.S. PATENT DOCUMENTS

| | | | | |
|---|---|---|---|---|
| 9,007,302 | B1* | 4/2015 | Bandt-Horn | G06F 3/0202 345/156 |
| 2006/0001650 | A1* | 1/2006 | Robbins | G06F 3/0421 345/173 |
| 2009/0172532 | A1* | 7/2009 | Chaudhri | G06F 3/0482 715/702 |
| 2010/0103132 | A1 | 4/2010 | Ikeda et al. | |
| 2010/0235793 | A1* | 9/2010 | Ording | G06F 1/1626 715/863 |
| 2010/0257490 | A1* | 10/2010 | Lyon et al. | 715/863 |

(Continued)

FOREIGN PATENT DOCUMENTS

| | | |
|---|---|---|
| CN | 101923423 | 12/2010 |
| CN | 102707873 | 10/2012 |

(Continued)

OTHER PUBLICATIONS

European Search Report dated Aug. 30, 2017 issued in counterpart application No. 131887028-1507, 6 pages.

(Continued)

*Primary Examiner* — Calvin C Ma
(74) *Attorney, Agent, or Firm* — The Farrell Law Firm, P.C.

(57) ABSTRACT

A method and apparatus are provided for displaying information in a portable device. The method includes displaying content on a first display area of a display unit; displaying information related to the content on a second display area; detecting a touch interaction on the displayed information; selecting information corresponding to the detected touch interaction; detecting a movement of the touch interaction in a movement direction; and displaying sub information of the selected information based on the detected movement of the touch interaction in the movement direction.

13 Claims, 23 Drawing Sheets

(56) References Cited

U.S. PATENT DOCUMENTS

| | | | |
|---|---|---|---|
| 2011/0016390 A1 | 1/2011 | Oh et al. | |
| 2011/0107209 A1* | 5/2011 | Ha et al. | 715/702 |
| 2012/0147057 A1 | 6/2012 | Lee | |
| 2012/0210275 A1 | 8/2012 | Park et al. | |
| 2012/0227010 A1 | 9/2012 | Lin et al. | |
| 2012/0240075 A1* | 9/2012 | Kim et al. | 715/776 |
| 2012/0284673 A1* | 11/2012 | Lamb et al. | 715/863 |
| 2013/0326611 A1* | 12/2013 | Gargi | 726/16 |

FOREIGN PATENT DOCUMENTS

| | | |
|---|---|---|
| EP | 2 182 522 | 5/2010 |
| EP | 2 278 447 | 1/2011 |
| EP | 2 463 768 | 6/2012 |
| EP | 2 495 646 | 9/2012 |

OTHER PUBLICATIONS

Chinese Office Action dated Aug. 18, 2017 Issued in counterpart application No. 201310481800.5, 18 pages.

* cited by examiner

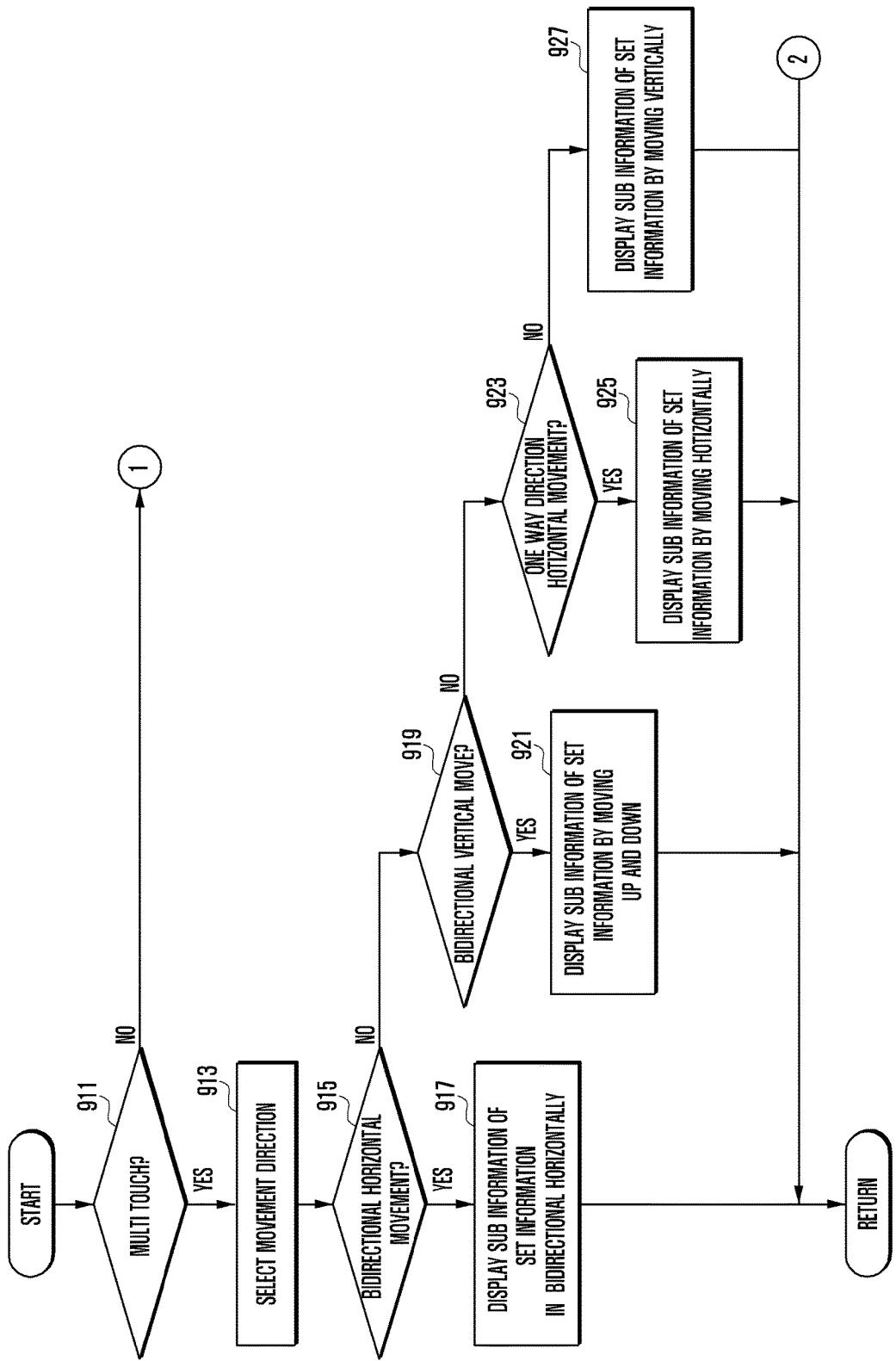

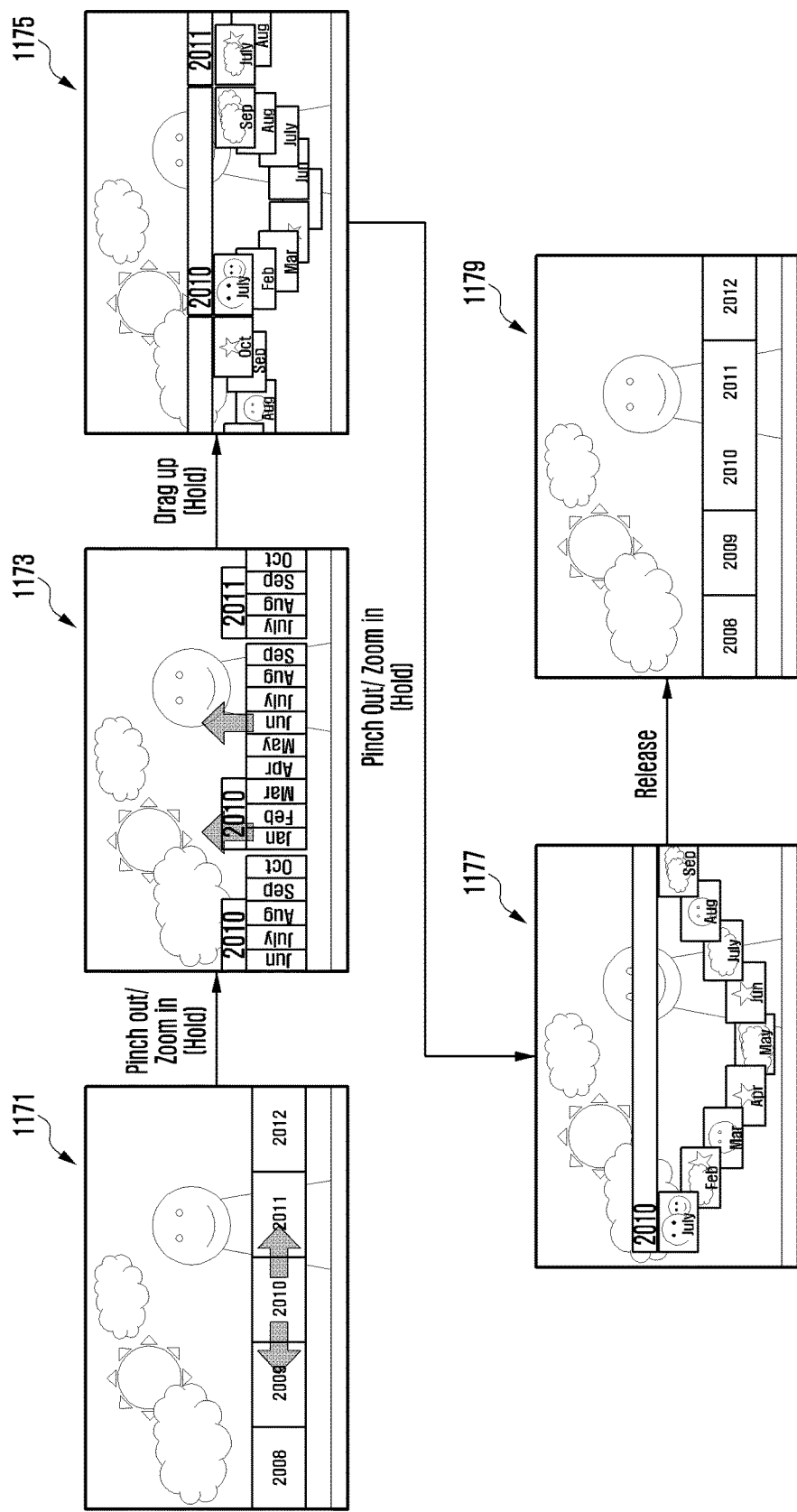

APPARATUS AND METHOD FOR DISPLAYING INFORMATION IN A PORTABLE TERMINAL DEVICE

PRIORITY

This application claims priority under 35 U.S.C. § 119(a) to Korean Patent Application Serial No. 10-2012-0114315, which was filed in the Korean Intellectual Property Office on Oct. 15, 2012, the entire disclosure of which is hereby incorporated by reference.

BACKGROUND OF THE INVENTION

1. Field of the Invention

The present invention relates generally to a display apparatus and method of a portable terminal, and more particularly, to an apparatus and a method for displaying content information in a portable terminal.

2. Description of the Related Art

In general, a portable terminal includes various content, which may include multiple folders, and may be configured with multiple chapters and/or pages. For example, an eBook is often configured with a plurality of chapters, and each chapter is configured with a plurality of pages. In addition, a photo-saving gallery may be categorized by photograph date or a table of contents, and the various photos may be configured on each date and the table of contents.

However, because a size of a display screen is limited in a portable terminal, when displaying content, a relatively complex operation is performed, compared to a computer, in order to verify other content than that current being displayed. For example, to verify content, a user of a portable terminal will click through corresponding folders one by one, or scroll through information which is displayed on the screen.

For example, to verify the content that is configured in a folder, a user will have to click through a number of the stacked folder (e.g., a number of a depth) in order to select the folder having desired information. That is, when desired information is positioned in a fifth depth in the folder, a user will open the folder by clicking five times.

Similarly, for an eBook, in order to get to a desired page, the user generally searches for the desired page by scrolling through the pages of the eBook displayed on the screen.

SUMMARY OF THE INVENTION

Accordingly, the present invention is designed to address at least the above-mentioned problems and/or disadvantages and to provide at least the advantages described below.

An aspect of the present invention is to provide an apparatus and method for efficiently displaying content information in a portable terminal.

Another aspect of the present invention is to provide an apparatus and method that control an amount of information and a writing scheme of the information by adjusting an interval and a height of the information according to a touch interaction direction for multiple information expressed on a screen.

In accordance with an aspect of the present invention, a method for displaying information on a portable terminal is provided. The method includes displaying content on a first display area of a display unit; displaying information related to the content on a second display area; detecting a touch interaction on the displayed information; selecting information corresponding to the detected touch interaction; detecting a movement of the touch interaction in a movement direction; and displaying sub information of the selected information based on the detected movement of the touch interaction in the movement direction.

In accordance with another aspect of the present invention, an apparatus is provided for displaying information on a portable terminal. The apparatus includes a display unit that display content on a first display area, and displays information related to the content on a second display area; an input unit that receives a touch interaction; and a controller that detects a movement of the touch interaction, selects the displayed information based on the touch interaction, and displays sub information of the selected information in the detected movement direction.

In accordance with another aspect of the present invention, a method for displaying information on a portable terminal is provided. The method includes displaying information including sub information; detecting a touch interaction; selecting the displayed information based on the detected touch interaction; detecting a movement direction of the touch interaction; and displaying the sub information of the selected information in the detected movement direction.

In accordance with another aspect of the present invention, a method for displaying information in a portable terminal is provided. The method includes displaying a folder image on a display unit; detecting a touch interaction; selecting a folder based on the detected touch interaction; detecting a movement of the touch interaction in a movement direction; and displaying sub information of the folder based on the detected movement of the touch interaction in the movement direction.

BRIEF DESCRIPTION OF THE DRAWINGS

The above and other aspects, features, and advantages of certain embodiments of the present invention will be more apparent from the following detailed description in conjunction with the accompanying drawings, in which:

FIGS. 9A and 9B are flowcharts illustrating a method of displaying information according to a user touch interaction according to an embodiment of the present invention;

FIGS. 11A to 11E illustrate examples of information displayed according to an embodiment of the present invention;

DETAILED DESCRIPTION OF EMBODIMENTS OF THE INVENTION

Figure 1:
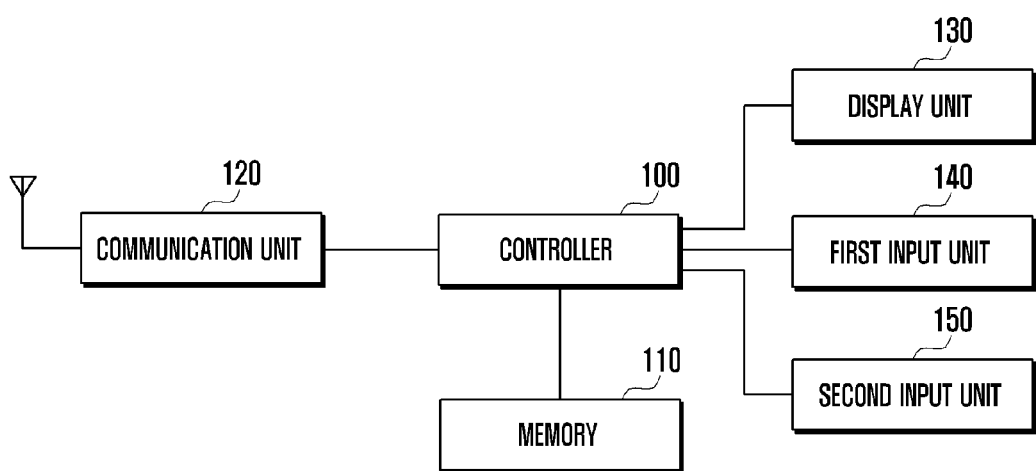
FIG. 1 illustrates a portable terminal according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Herein, "content" refers to data that is displayed when executing an application. For example, the content may be an image of a page or a chapter that is selected by a user when executing an eBook reader, may be a photo that is selected by the user when executing a gallery viewer, may be an icon (or an item, a widget, etc.) for an application that is selected by the user when executing a home screen, may be a document writing image or a document folder when executing a document writing application, or may be a folder image (for example, an incoming call, an outgoing call, and a missed call) of a corresponding call conversation, when executing a communication function (e.g., a text message, a call, an email, a Multimedia Messaging Service (MMS), etc.)

Further, "information" refers to information related to the content, such as a thumbnail of a chapter and/or a page of an eBook, a thumbnail image of corresponding gallery folder, or a thumbnail image of a document folder or a document.

Herein, a folder may have a stack structure, such that the content has a plurality of folders in horizontal and vertical directions.

In accordance with an embodiment of the present invention, a portable terminal selects a specific folder according to a user touch interaction, and controls the amount of folders displayed and a display scheme of the folders by adjusting an interval and a height of the folders, e.g., by unfolding or reducing the selected folder in a touch interaction direction. For example, the portable terminal may be a portable phone, a smart phone, an MP3 terminal, a tablet, a computer, etc.

In addition, the content may be configured with multiple chapters and the pages therein. The portable terminal may display content and configuration information of the content (e.g., the chapter and/or the page of the content) as a thumbnail. In this case, the portable terminal selects a specific chapter (or the page) according to a user touch interaction, and controls the amount of information of the content to be displayed and the display method by adjusting an interval and a height of the chapters (or the page), e.g., by unfolding or reducing the selected chapters (or the page) in a touch interaction direction.

The content may have a folder structure and/or a chapter structure, and the information may be the information about the folder of the content or the chapter (and/or the page).

In the following description, the configuration information of the content may also be referred to as an "item". In this case, in the content of the folder structure, an item may have a stack structure, and the item may have a plurality of items having a horizontal depth, and a plurality of sub items having a vertical depth to the item thereof.

In addition, in the content of the chapter (and/or the page) structure, the item may have a plurality of chapters (and/or the pages), and a sub item may also have a plurality of chapters (and/or pages) having a structure vertical to the item.

In addition, the content having the chapter (and/or the page) structure displays a specific page of the content on a first display area, which is a main screen display area, by a user selection, and displays the chapter (and/or the page) on some areas (for example, on a bottom display area of a first display area) of the screen. Also, the content having the folder structure may display a configuration of the sub folder by a user selection.

A portable terminal according to an embodiment of the present invention controls an interval and a height of information (an item) while displaying with expanding or reducing multiple information (items) that are displayed on the screen according to a user touch interaction (e.g., a Multi touch(PinchZoom In/Out) in four directions (up, down, left, and right), to efficiently display the content information.

FIG. 1 illustrates a portable terminal according to an embodiment of the present invention.

Referring to FIG. 1, the portable terminal includes a controller 100, a memory 110, a communication unit 120, a display unit 130, a first input unit 140, and a second input unit 150.

The communication unit 120 performs wired or wireless communication function with a base station or other device. For example, the communication unit 120 may be a wireless transceiver that wirelessly communicates with a base station, The controller 100 controls the overall operation of the portable terminal, including the displaying of configuration information for content being displayed. The controller 100 sets an item to be displayed according to a user touch interaction and displays corresponding sub items by expanding or reducing the set item according to a direction of the touch interaction.

The memory 110 includes a program memory storing operation programs of the portable terminal, and a data memory for storing data.

The display unit 130 displays application information. For example, the display unit 130 may include a Liquid Crystal Display (LCD) or an Organic Light Emitting Diode (OLED) display.

The first input unit 140, i.e., a touch panel, may be implemented as a capacitive type or a resistive type input device, and outputs a position information corresponding to a user touch (e.g., a finger touch) to the controller 100.

The second input unit 150, i.e., an Electro-Magnetic Resonance (EMR) panel, includes an EMR sensor pad, and detects a pen touch input to output to the controller. Although illustrated as separate devices for clarity, the display unit 130, the first input unit 140, and the second input unit 150 may be configured as an integral device.

Figure 2:
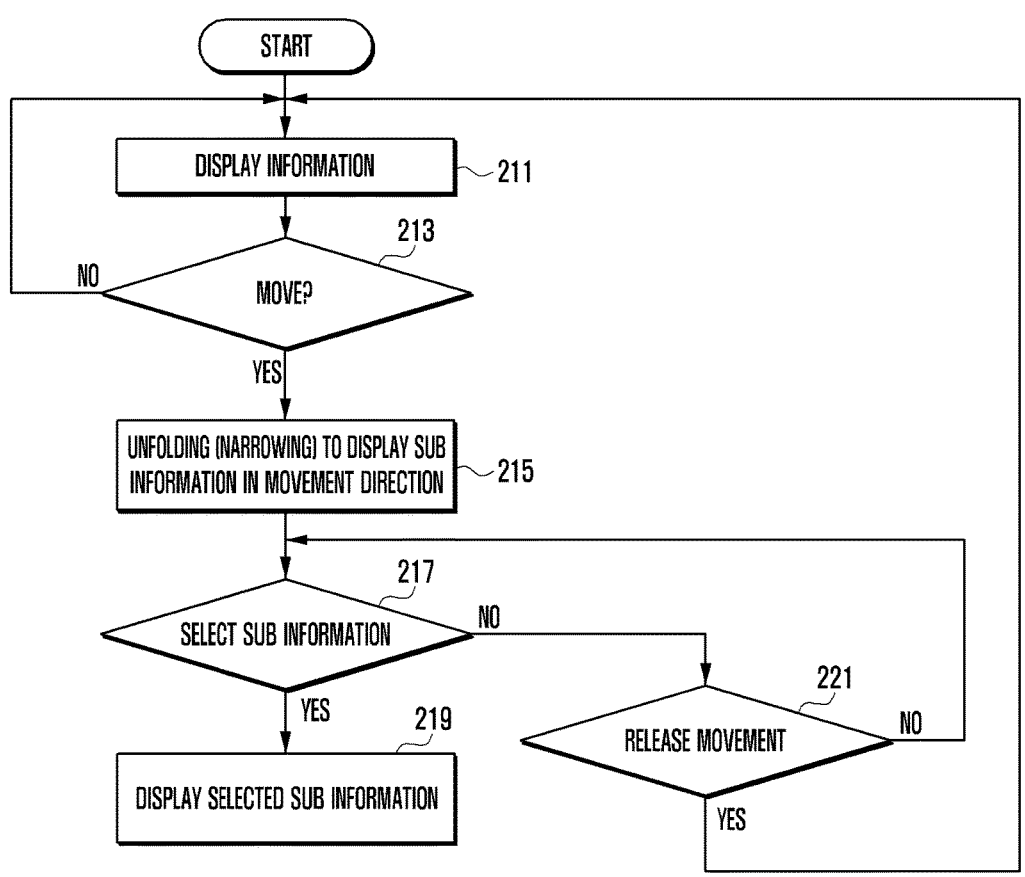
FIG. 2 is a flowchart illustrating a method for displaying information in a portable terminal according to an embodiment of the present invention.

FIG. 2 is a flowchart illustrating a method for displaying information in a portable terminal according to an embodiment of the present invention.

Referring to FIG. 2, the controller 100 displays content and/or information on the display unit 130 in step 211. As described above, the content may be configured with chapters and/or pages, such as an eBook, and may be a folder that is configured by a timeline and/or a subject. When displaying the content, data of the content is displayed on a first display area of the display unit 130, and the information is displayed on a second display area. In addition, when displaying a folder, the folder is a stack structure in which one folder may be displayed, or a plurality of folders may be displayed.

When displaying the information, when the user generates the touch interaction on the information display area, the controller 100 checks if the touch interaction is an input for a movement of the information in step 213. For example, the touch interaction may be a drag (a touch, a drag, and drop) movement, and a touch may be a single touch or a multi touch input.

When the touch interaction for the movement of the information, and the controller 100 unfolds or narrows and displays sub information of the information based on the direction of the touch interaction in step 215.

When the touch interaction is performed after a touch is released and made again within a preset time, the controller 100 may process a continuous touch interaction, and as a result, the user may unfold or narrow to display the information with a desired distance (e.g., a horizontal movement distance) by the touch interaction, and also controls to display a height (e.g., a vertical movement distance) of the information.

In step 217, the controller 100 determines if the user selects the displayed sub information. When the user selects the displayed sub information, the controller 100 displays the selected sub information on the display unit 130 in step 219. Basically, the user searches for particular information in step 215, and selects the corresponding information in step 217.

While the sub information is being unfolded and displayed in step 215, and when no selection of the sub information is made in step 217, the controller determines if the user has performed a touch release in step 221. When the user terminates the touch interaction (performs a touch release) in step 221, the controller 100 reverts to the original information display state in step 211. However, if no touch release is detected in step 221, the controller continues to determine if any of the sub information is selected in step 217.

FIGS. 5A to 5E illustrate examples of information displayed according to an embodiment of the present invention.

Figure 5A:
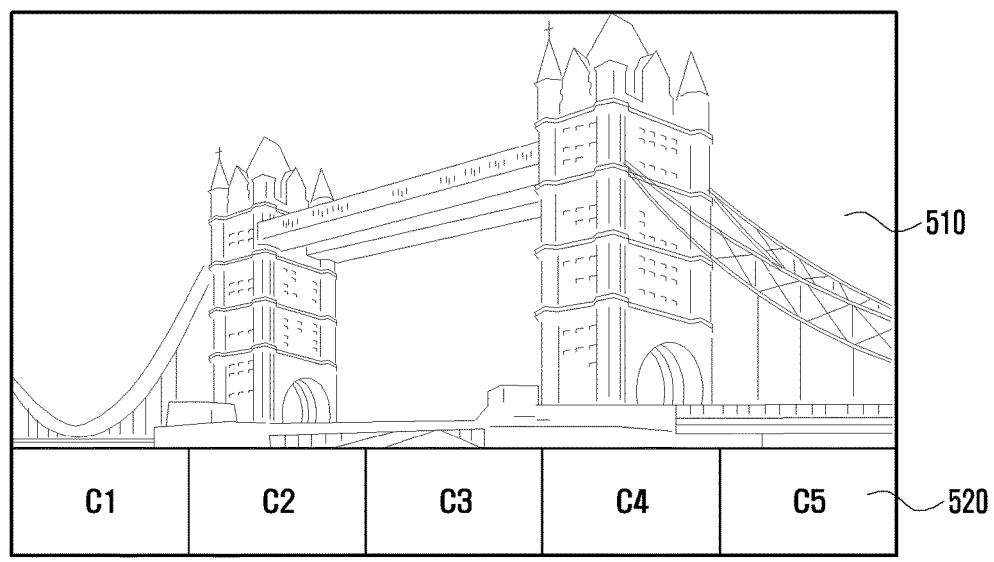
FIGS. 5A to 5E illustrate examples of information displayed according to an embodiment of the present invention.

Referring to FIG. 5A, information that is displayed in step 211 of FIG. 2 is displayed such that content is displayed on a first display area 510 and the content information is displayed on a second display area 520 as FIG. 5A.

Figure 7:
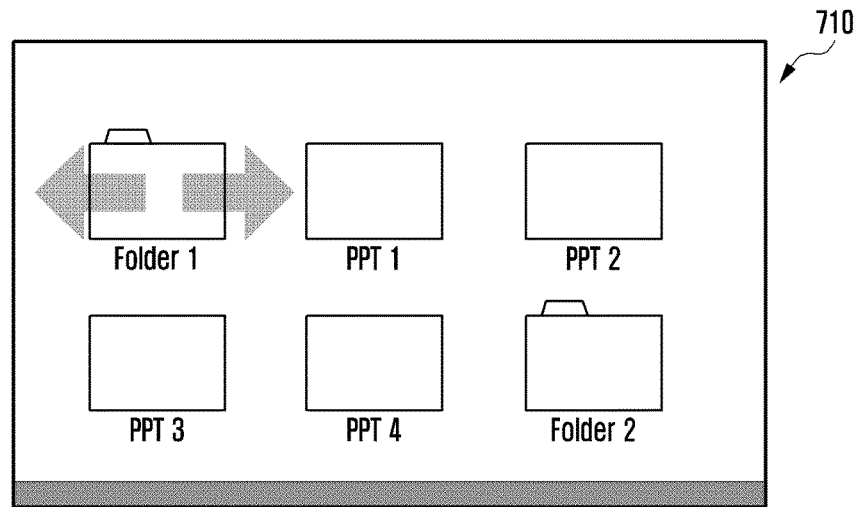
FIG. 7 illustrates an interval and a height of information displayed according to an embodiment of the present invention.
Figure 7:
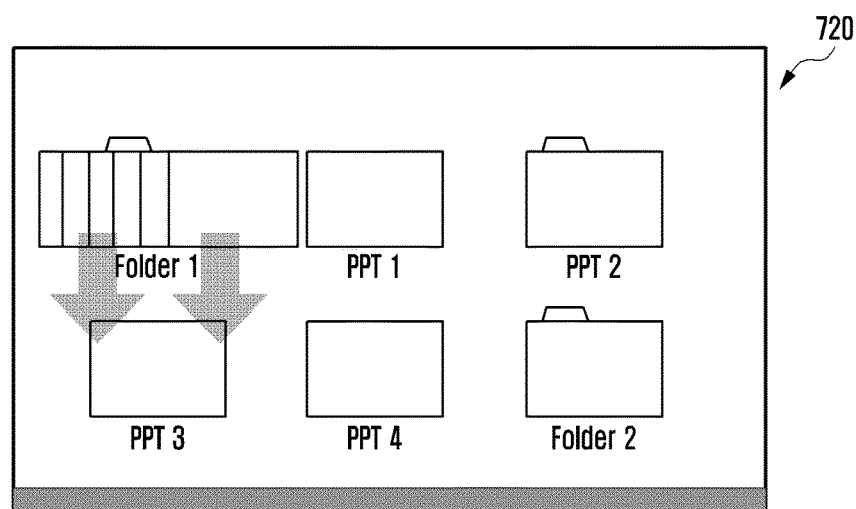
Figure 7:
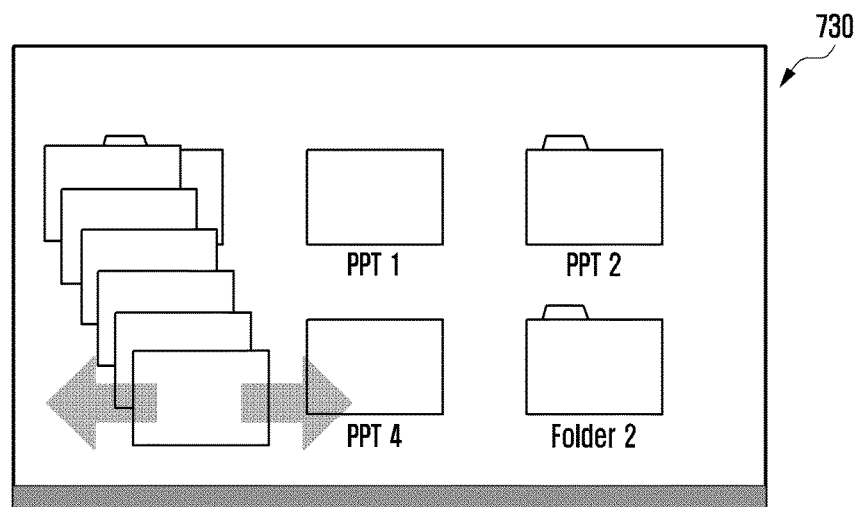

FIG. 7 illustrates an interval and a height of information displayed according to an embodiment of the present invention.

Referring to FIG. 7, when information is formed as folders, the information that is displayed in step 211 of FIG. 2 is displayed such at least one folder is displayed on the display unit 130 as illustrated on screen 710.

Figure 3:
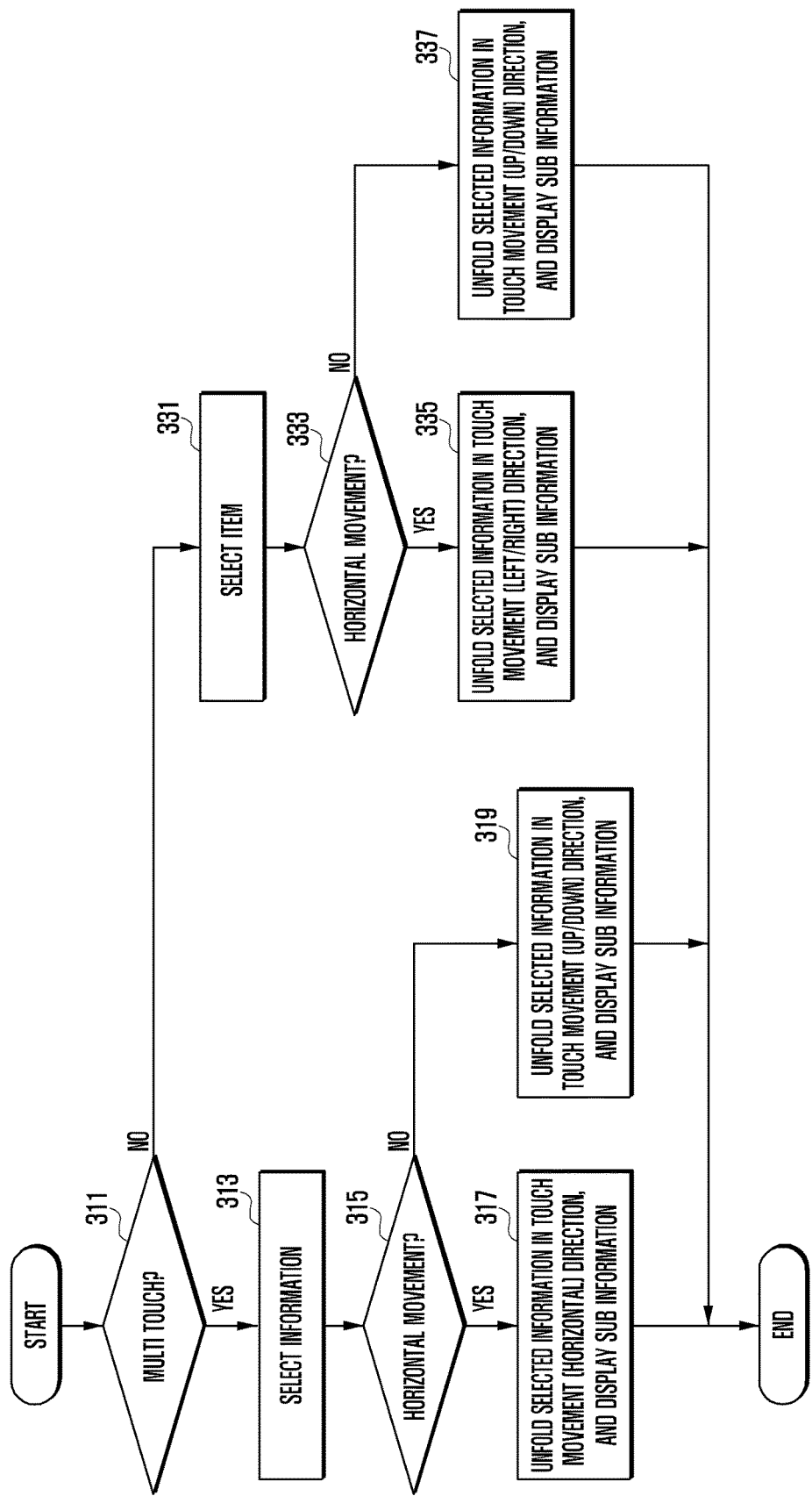
FIG. 3 is a flowchart illustrating a method for displaying information according to a user touch interaction according to an embodiment of the present invention.

FIG. 3 is a flowchart illustrating a method for displaying information according to a user touch interaction according to an embodiment of the present invention. In the following description of FIG. 3, it is assumed that content is displayed on the first display area 510 and content information is displayed on the second display area 520, as illustrated in FIG. 5A.

Referring to FIG. 3, a touch interaction that moves information may be performed with a multi touch or single touch input. When using the multi touch input, information that is positioned between two touch points may be selected, and each of touched information may be selected when two touch points are generated from two information. For example, the multi touch may be a pinch zoom in/out.

When the multi touch input is detected by the controller 100 in step 311, and the controller selects information to be displayed corresponding to the multi touch input in step 313. Next, the controller 100 checks the movement direction of the multi touch input, and unfolds and displays the sub information of the selected information according to the movement direction.

Figure 5B:
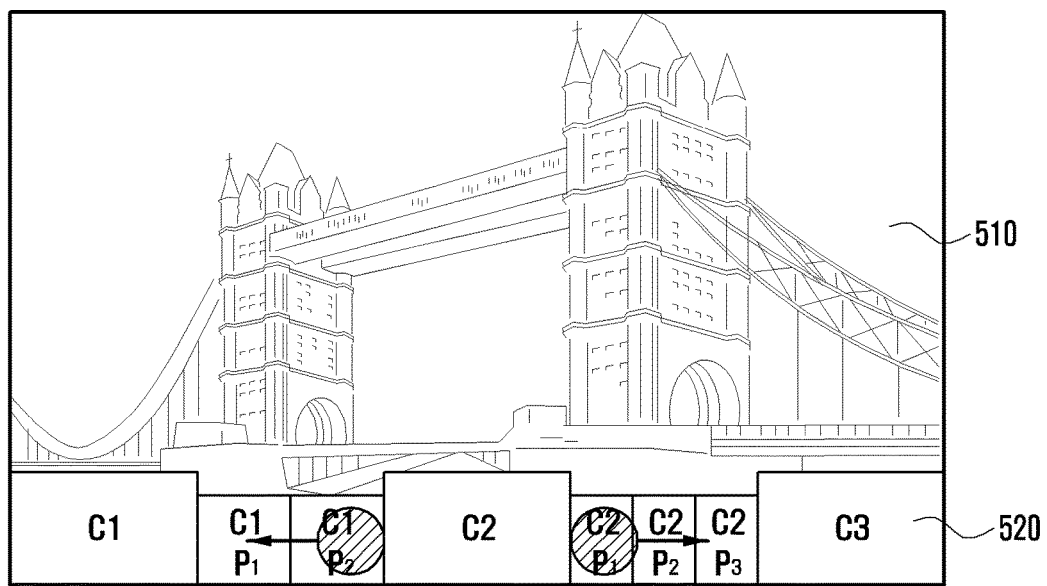

More specifically, when the controller detects a horizontal movement in step 315, the controller 100 unfolds and displays, in step 317, sub information of the selected information to the left and the right in the second display area 520, as illustrated in FIG. 5B.

Figure 5C:
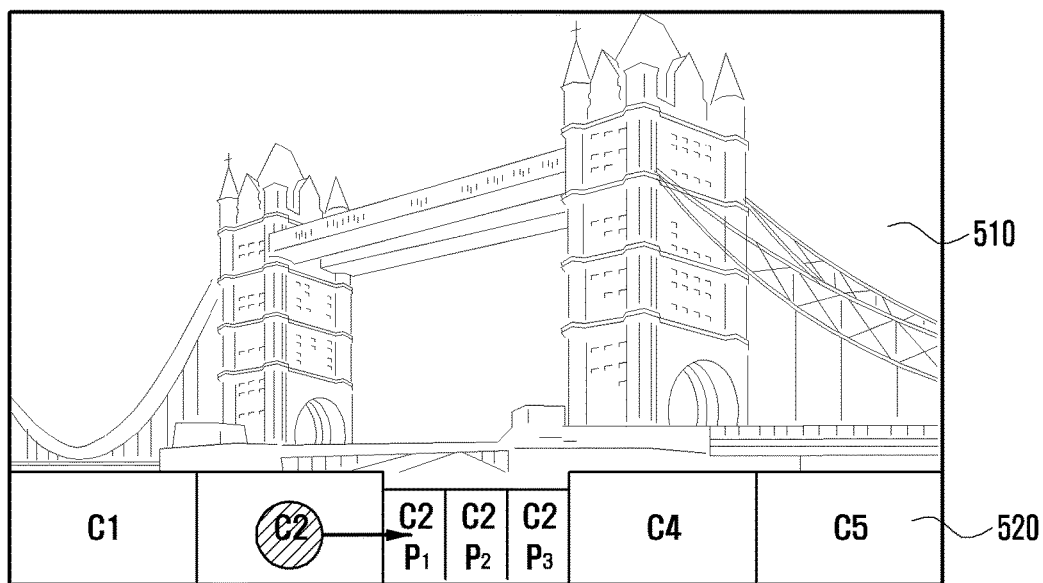
Figure 5D:
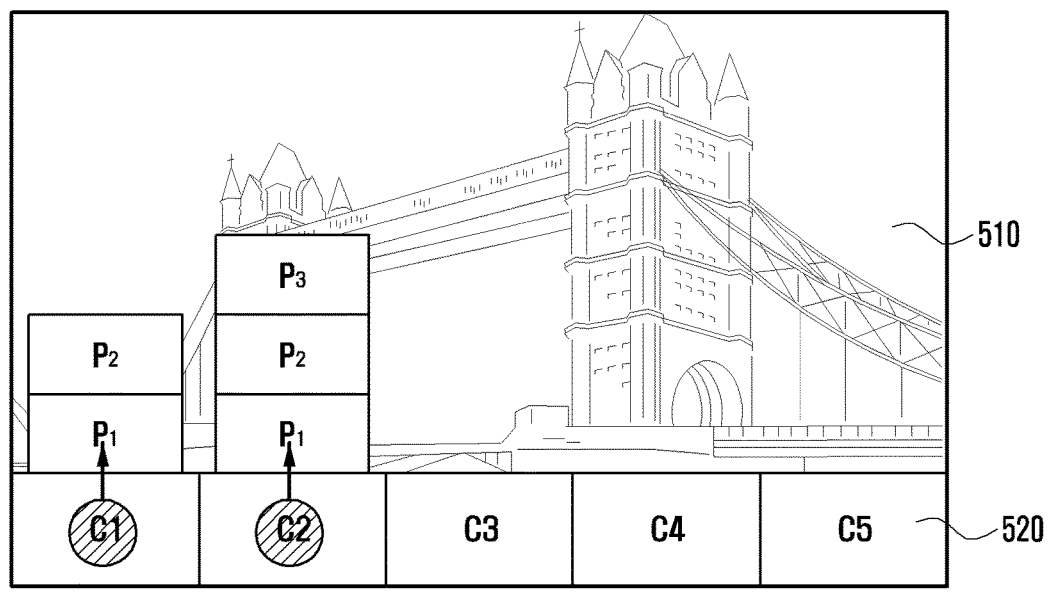

However, when the controller 100 detects vertical movement (up and down) in step 315, the controller 100 unfolds and displays, in step 319, the sub information of the selected information to the upper or lower side from the second display area 520 into the first display area 510, as illustrated in FIG. 5D. In other words, when a touch interaction that moves up and down is generated, the controller 100 unfolds and displays the information displayed on the second display area 520 into the first display area 510.

When the multi touch input is not detected, i.e., when the single touch input is generated, in step 311, the controller 100 selects information to display corresponding to the single touch input in step 331. Thereafter, the controller 100 checks a movement direction of the single touch input in step 333, and unfolds and displays the sub information of the selected information according to the movement direction.

More specifically, when a horizontal movement is detected by the controller 100 in step 333, the controller 100 unfolds and displays, in step 335, sub information of the selected information in the horizontal movement direction (a drag or a scroll direction), as illustrated in FIG. 5C.

Figure 5E:
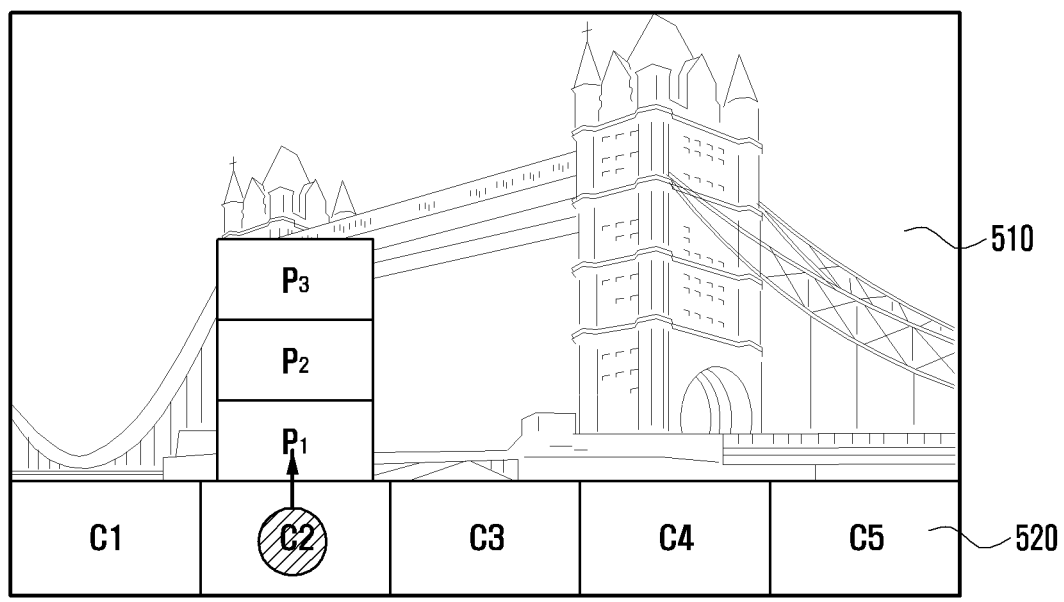

Similarly, when the horizontal movement is not detected, but a vertical movement is detected by the controller 100 in step 333, the controller 100 unfolds and displays, in step 337, the sub information of the selected information to the upper or lower side, as illustrated in FIG. 5E.

Figure 6:
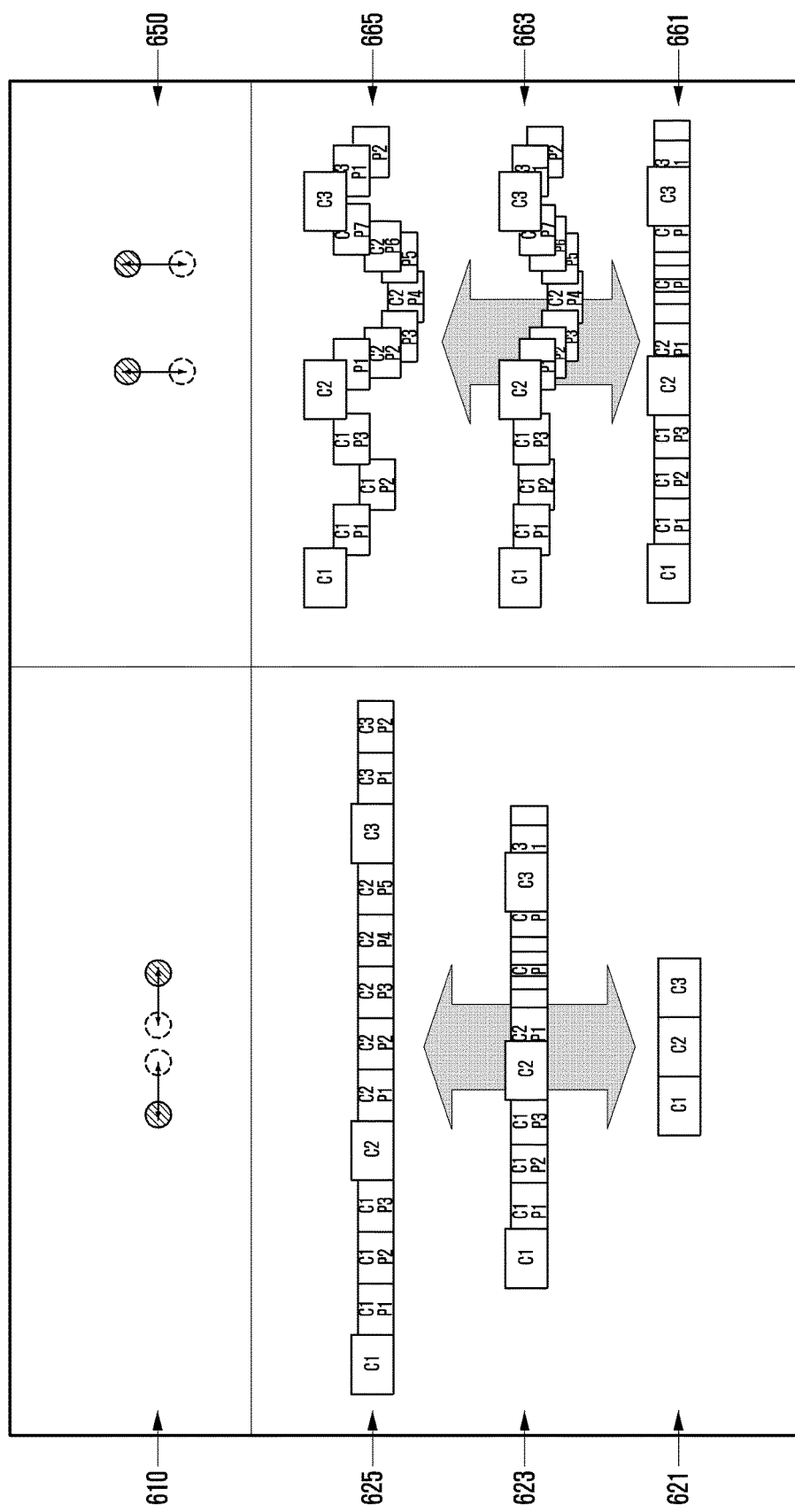
FIG. 6 illustrates an interval (a horizontal distance) and a height (a vertical distance) of information displayed according to an embodiment of the present invention.

FIG. 6 illustrates an interval (a horizontal distance) and a height (a vertical distance) of information displayed according to an embodiment of the present invention.

Referring to FIG. 6, when the user performs a pinch zoom in/out movement in the horizontal direction, as illustrated by input 610, when displaying information 621, the controller 100 unfolds (or narrows) and displays sub information 621-625 of the selected information. That is, when the user performs a zoom in touch interaction where the information 621 is displayed, the controller 100 unfolds and displays the sub information 623 and 625. Similarly, the controller 100 narrows to display the sub information and information 623 and 621, when the user performs a zoom out touch interaction on sub information 625.

In addition, when the user performs the pinch zoom in/out movement in a vertical direction 650 while displaying information 661, the controller 100 unfolds and displays sub information of the selected information 621-625. That is, when the user performs pinch out/zoom in touch interaction when information 621 is displayed, the controller 100 unfolds and displays the sub information 664 and 665 to the upper side (or the lower side). Similarly, the controller 100 narrows and displays the sub information and information 663 and 661, when performing the pinch in/zoom out touch interaction while sub information 665 is displayed.

Although FIG. 6 illustrates that the sub information unfolded in the horizontal direction is unfolded to display in the upper direction by the vertical touch interaction, after unfolding the sub information of the information selected by the horizontal touch interaction in the horizontal direction to display, first, even when performing the horizontal interaction after performing the vertical touch interaction first, the sub information of the selected information may be displayed as the identical method.

Although FIGS. 5A to 6 are diagrams displaying content on a screen in a first display area 510 and displaying content information in a second display area 520, the above-described information display method may also be applied identically to the case of displaying the folders as FIG. 7.

Referring to FIG. 7, when a horizontal or a vertical touch interaction is generated, as illustrated in screens 710 and 720, respectively, when a plurality of folders are displayed on the display unit 130, as illustrated in screen 710, the controller 100 selects the folder according to the touch interaction, and displays the sub folder of the selected folder or the content. Basically, when the touch interaction is generated in the specific folder position, the controller 100 unfolds (or narrows) and displays the sub folders of the corresponding folder or the content in the touch interaction direction, as shown in screens 720 (result of horizontal movement in screen 710) and 730 (result of vertical movement in screen 720).

For example, when the content is an eBook, the specific page of the eBook is displayed on a first display area 510, and the information of the eBook is displayed on a second display area. 520. Here, it is assumed that the information of the eBook becomes chapter information, and the sub information of the chapter information is the page information. Also, it is assumed that the information of the eBook is displayed as the thumbnail.

In this case, the first display area 510 of a screen may navigate to the left and right (or up and down) of data (here, page data of the eBook) which is displayed on the screen by the touch input, such as a user scroll or a drag, and the user executes thumbnail navigation on a second display area 520, and selects a desired page to move.

When the executed thumbnail navigation is displayed on the second display area 520, the displayed information may be configured of a chapter thumbnail and a text page thumbnail, which is sub information. Also, the user may display the information displayed on the second display area 520 by controlling an amount of the thumbnail information by a chapter view and an all view through the pinchZoom In/Out. Here, the chapter view refers to displaying a high level information, e.g., information 621 in FIG. 6, and the all view refers to displaying the high level information and all sub information corresponding to the high level information, e.g., sub information 625 of FIG. 6.

Figure 4:
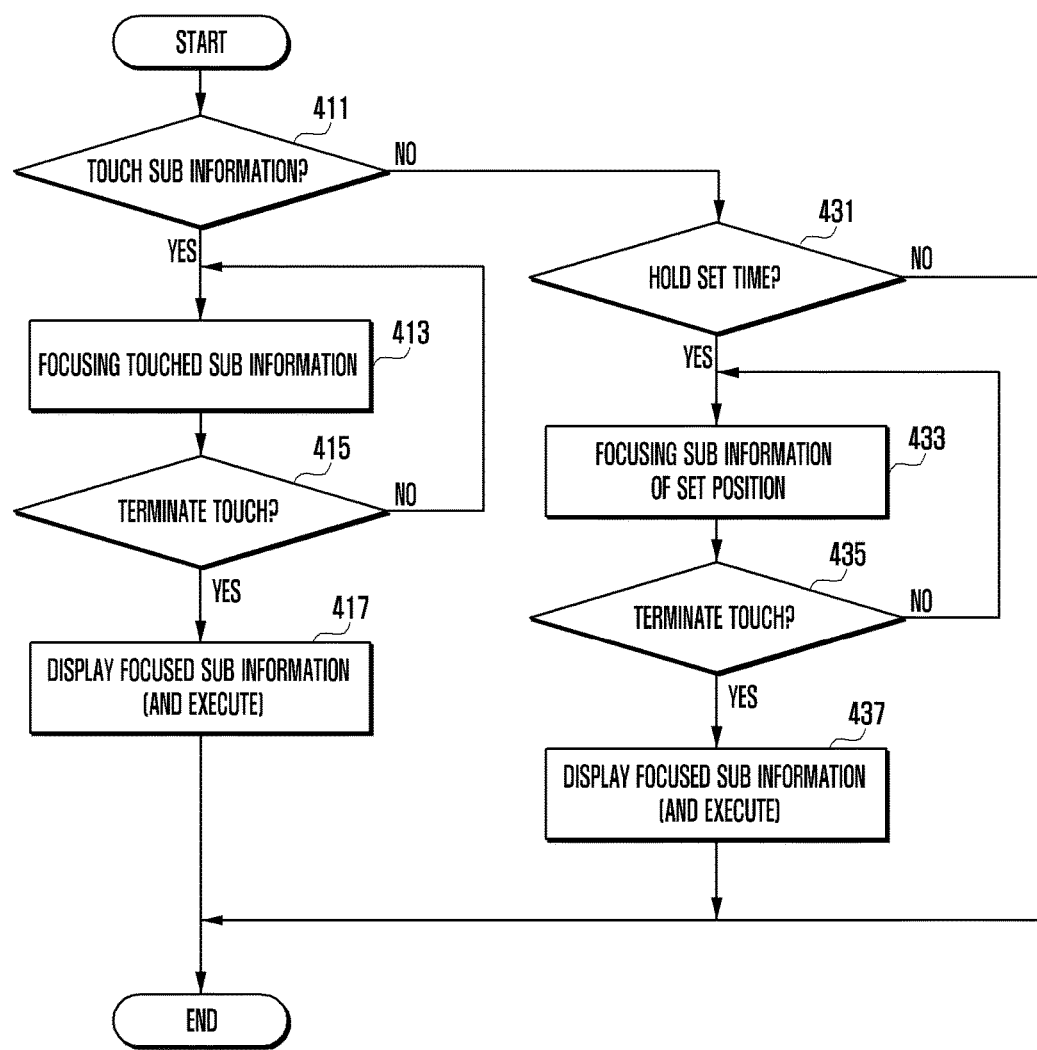
FIG. 4 is a flowchart illustrating a method for selecting information for displaying a according to an embodiment of the present invention.

FIG. 4 is a flowchart illustrating a method for selecting information for displaying a according to an embodiment of the present invention.

Referring to FIG. 4, the user may select to display (and/or execute) the content of the sub information when the information is displayed as illustrated in FIGS. 5A to 7. Here, the sub information may be selected by maintaining a touch of the desired sub information or a holding state of the touch interaction more than a set time.

Therefore, when the controller 100 detects the sub information is touched in step 411, the controller 100 focuses the touched sub information in step 413. Here, a touch selection of the sub information includes touching the sub information with another finger, while maintaining the touch interaction, or touching the sub information while displaying the information.

When releasing the touch interaction while displaying the sub information, if touch interaction exceeds the set time, it is detected as a movement release, as illustrated in step 221 of FIG. 2, and returns to its original state. However, the unfolded sub information is displayed during the set time after releasing the touch interaction.

When the controller 100 detects the termination of the touch of the selected sub information in step 415, the controller 100 displays or displays and executes the content of the focused sub information in step 417.

In addition, if the controller 100 detects that the touch interaction is maintained for more than the set time, while moving the information to the left and right and/or up and down, in step 431, and the controller 100 focuses the sub information of a default position which is set by the corresponding touch interaction in step 433. That is, when performing a multi touch interaction, the multi touched sub information or the sub information located between the multi touched positions may be selected.

When the controller 100 detects the releasing of the holding state of the touch interaction in step 435, the controller 100 displays or displays and executes the focused sub information in step 437.

Figure 8:
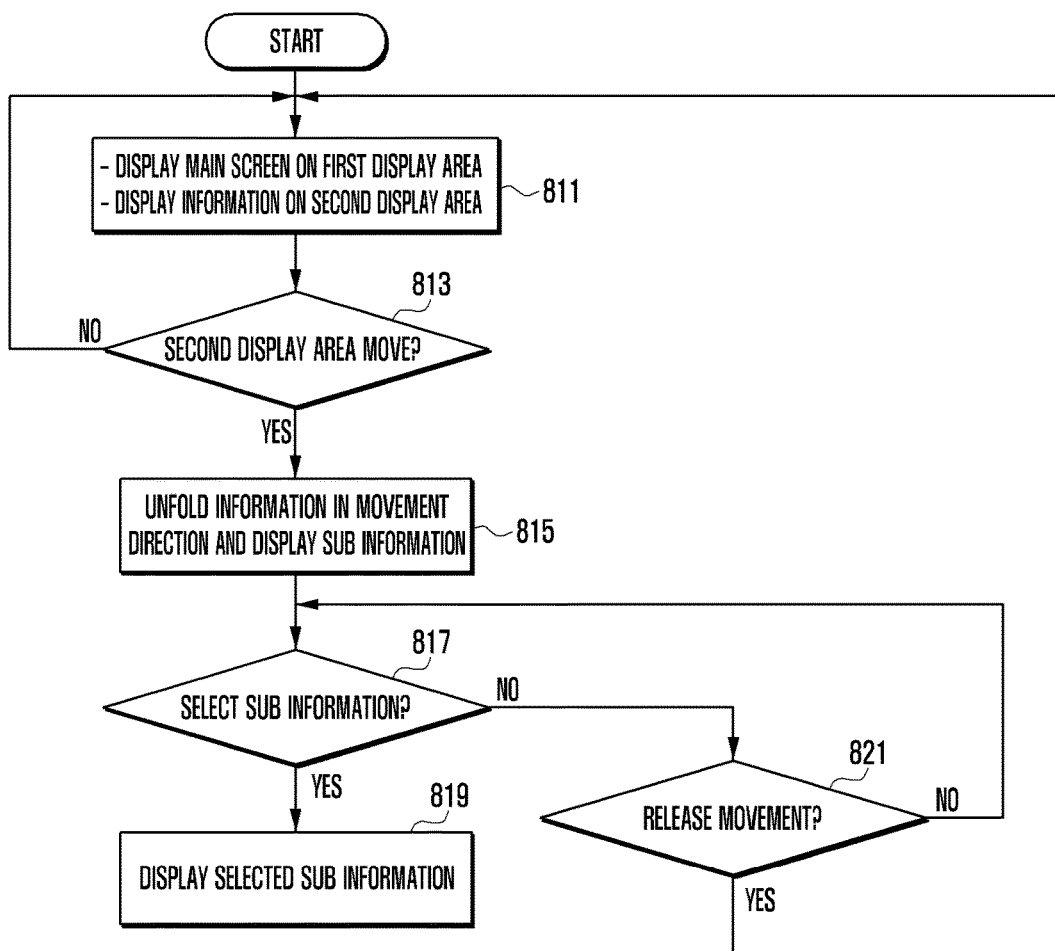
FIG. 8 is a flowchart illustrating a method for displaying information in a portable terminal according to an embodiment of the present invention.

FIG. 8 is a flowchart illustrating a method of displaying information in a portable terminal according to an embodiment of the present invention.

Referring to FIG. 8, when executing content, the controller 100 may display only the content on the display unit 130 or may display related information and the content according to a user selection, e.g., a soft key or a button, which is displayed on a content screen at the time of executing the contents.

The controller 100 displays the content on the first display area of the display unit 130 by the user's selection, and displays the information corresponding to the first display area on the second display area in step 811. Basically, the controller 100 splits the screen which is displayed on the display unit 130 into the first display area 510 and the second display area 520, as illustrated in FIG. 5A, and displays the content data on the first display area 510, and displays the information related to the content on the second display area 520.

When the controller 100 detects a touch interaction for moving the information in step 813, and the controller 100 unfolds (or narrows) and displays sub information of the information according to the direction of the touch interaction in step 815.

Here, when the touch is made again within the set time after the touch is released and the touch interaction is performed, the controller 100 processes as a continuous touch interaction, and as a result, the user may unfold or narrow to display the information with the desired distance (e.g., a horizontal movement distance) by the touch interaction, and also may control to display a height (e.g., a vertical movement distance) of the information.

When the controller 100 detects a user selection of the sub information in step 817, and the controller 100 displays the selected sub information on the display unit in step 819. Basically, the user searches for the information in step 815, and selects the desired information in step 817. As a result, the controller 100 displays the selected information on the display unit 130. Here, the information selection method maintains the holding state for a certain period of time or may touch to select the desired information in the state of unfolding and displaying the sub information.

In addition, when the user terminates the touch interaction (performs a touch release) in step 821, the controller 100 reverts to the original information displaying state in step 811.

Figure 9B:
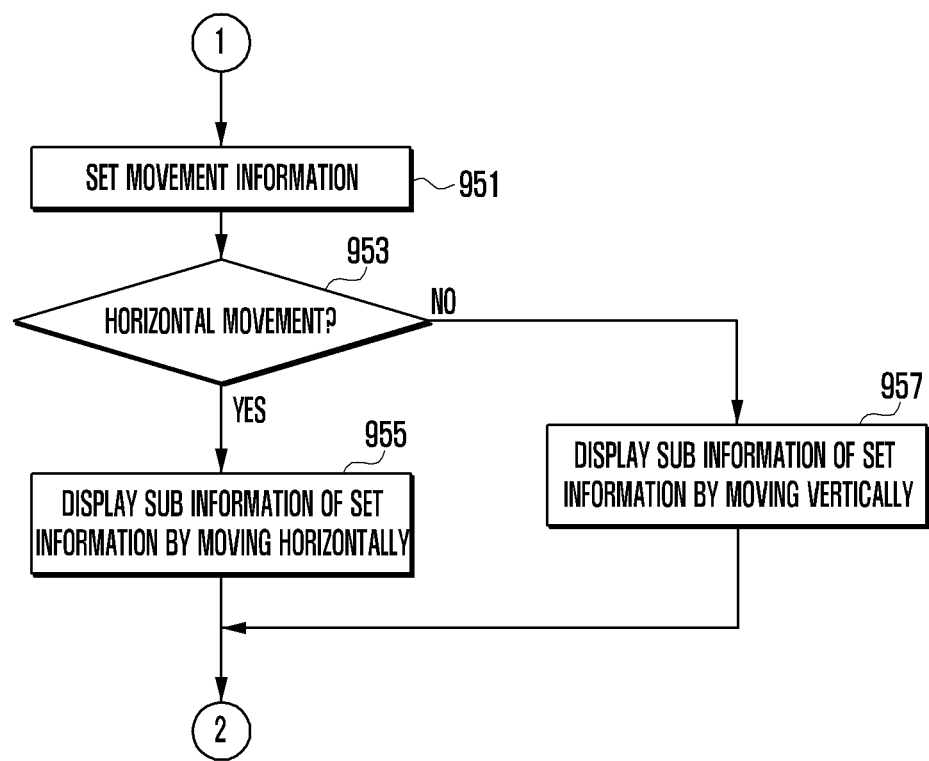

FIGS. 9A and 9B are flowcharts illustrating a method for displaying information according to a user touch interaction according to an embodiment of the present invention.

Referring to FIG. 9A, the controller 100 displays content on a first display area, and displays information related to the content on a second display area. A touch interaction which moves the contents related information displayed on the second display area of the display unit 130 may be performed with a multi touch or a single touch.

When the controller 100 detects a multi touch input in step 911, it selects information to be displayed in step 913.

Next, the controller 100 searches for a movement direction of the multi touch input, and unfolds and displays the sub information of the selected information according to the movement direction.

More specifically, when the controller 100 detects bidirectional horizontal movement (e.g., left and right movement, for example, pinch zoom in or out) through a first input unit 140 in step 915, and the controller 100 unfolds and displays the sub information of the selected information to the left and right in step 917. Here, when the touch interaction of the horizontal movement is generated on the second display area, the controller 100 unfolds and displays the sub information of the selected information on the second display area.

In addition, when the controller 100 detects up and down movement in step 919, and the controller 100 unfolds and displays the sub information of the selected information to the upper side and the lower side in step 921.

At this time, when the touch interaction which moves to the upper side is generated on the second display area, and the information is in state of being displayed on the second display area, the controller 100 unfolds and displays the sub information of the selected information in such a manner that the sub information of the selected information is expanded from the second display area to the first display area. In addition, when the touch interaction which moves to the up and down direction is generated, and two or more information are selected, the controller 100 moves and displays each selected information to the upper side and lower side respectively according to the movement direction.

If no bidirectional move are detected in steps 915 and 919, when the controller 100 detects one way horizontal movement in step 923, the controller 100 unfolds (or narrows) and displays the information to the left side (right side) direction in step 925. Similarly, when the controller 100 detects one way vertical movement in step 923, and the controller 100 unfolds (or narrows) and displays the information to the upper side (lower side) direction in step 927.

When the movement direction is executed only to one side, the controller 100 moves the information only to the movement direction.

When a multi touch input is not detected, i.e., a single touch input is detected, in step 911 in FIG. 9A, and the controller 100 selects the information to be displayed in step 951 in FIG. 9B. In step 951, the controller checks the movement direction of the single touch, and unfolds and displays the sub information of the selected information according to the movement direction.

More specifically, when the controller 100 detects the horizontal movement in step 953, it unfolds (or narrows) and displays the sub information of the selected information to the movement direction (a drag or a scroll direction) in step 955. In addition, when the controller 100 detects the up and down movement in step 953, it unfolds and displays the sub information of the selected information to the upper side or the lower side in step 957.

Figure 10:
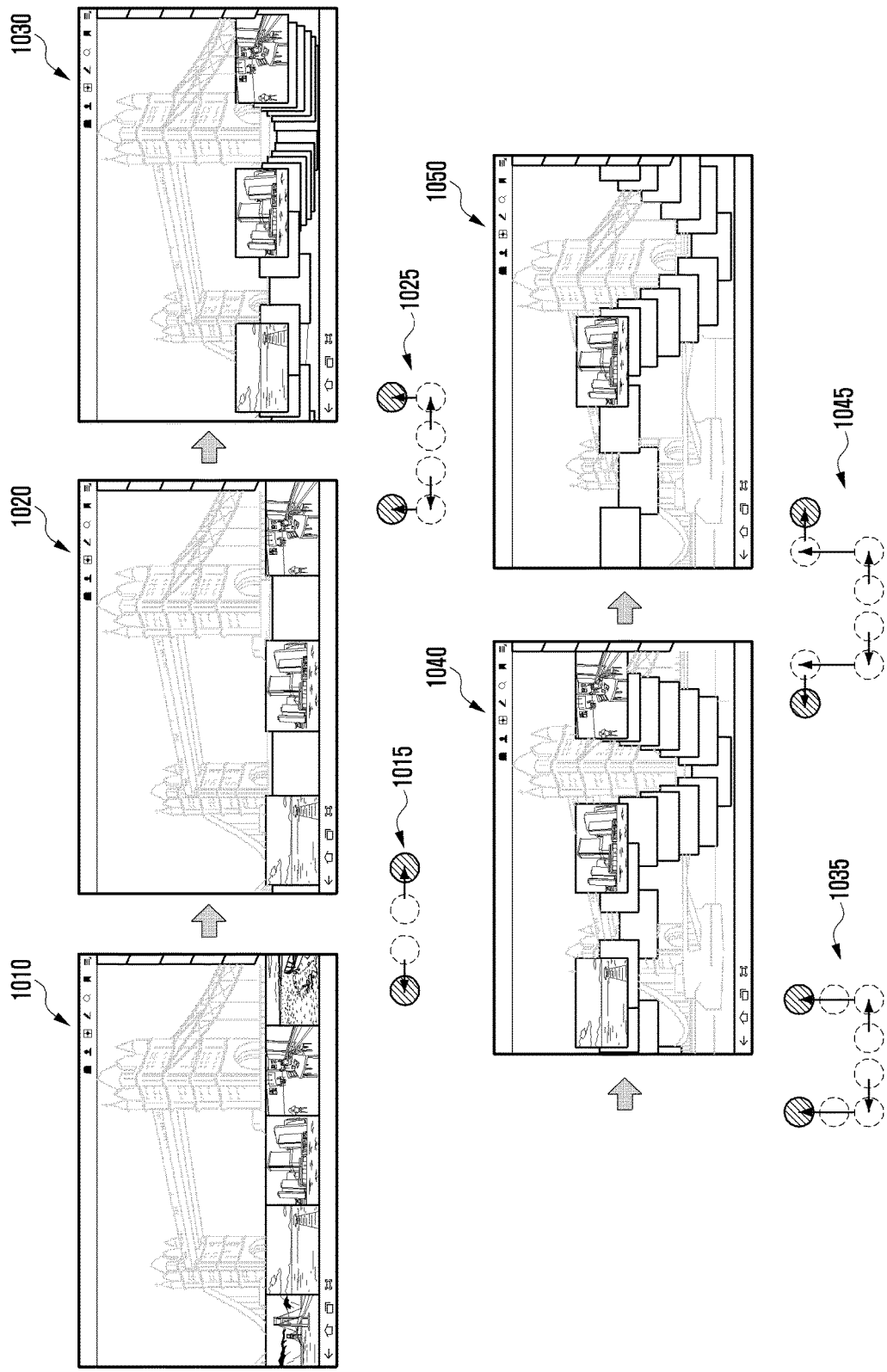
FIG. 10 illustrates examples of displayed information according to an embodiment of the present invention.

FIG. 10 illustrates examples of displayed information according to an embodiment of the present invention. Specifically, FIG. 10 illustrates a gallery folder which stores photos in a portable terminal, wherein the content (a photo image) is selected by the user and displayed on the first display area, and the photo images of the gallery folder are displayed as a thumbnail image on the second display area.

Referring to FIG. 10, in screen 1010, the controller 100 displays content on a first display area of a display unit 130, and displays information related to the content on a second display area.

In screen 1020, when the user performs a bidirectional horizontal movement 1015 (e.g., "pinch zoom in" or "pinch out/zoom in"), the controller 100 unfolds and displays the information (e.g., a thumbnail image).

In screens 1030 and 1040, when the user moves to the upper side direction while maintaining the multi touch with movements 1025 and 1035, the controller 100 unfolds and displays the information (the thumbnail image) which is unfolded to be displayed in the horizontal direction. At this time, it may be known that the information (the thumbnail image) is expanded to be displayed from the second display area to the first display area.

In screen 1050, when the user performs the bidirectional horizontal movement 1045 (pinch zoom in) while maintaining the multi touch, the controller 100 unfolds and displays the information (i.e., the thumbnail image) in the horizontal direction again.

As illustrated in FIG. 10, an information display method according to an embodiment of the present invention expands and displays information of the second display area in the horizontal direction according to the touch interaction of the user, and expands and displays the information up to the first display area, when the touch interaction is generated in the upper side direction. Therefore, the information related to the content may be expanded and displayed in horizontal and vertical directions of the display unit 130.

Although FIG. 10 illustrates an example of information display corresponding to a multi touch interaction, the information may be expanded and displayed in the horizontal and the vertical direction for single touch inputs by the same method.

The multi touch interaction may be a pinch zoom in/out. In this case, first, the controller 100 identifies the information by controlling an amount of the thumbnail information in the called corresponding area of thumbnail navigation (i.e., the second display area) through a pinch zoom in/out, and secures a wider navigation area such that a screen movement can be executed. In the above state, when moving to the upper part without releasing during the pinch zoom in/out, the controller 100 re-arranges the thumbnails which were arranged in the narrow space to the up and down in proportion to the movement distance.

In addition, as described above, when performing Pinch Zoom In/Out again without releasing during the movement to the upper part, the controller 100 may re-arrange the thumbnail image to the left and right in proportion to the left and right interval in the rearrangement state of up and down direction.

When releasing the multi touch without selecting the thumbnail image, the controller 100 maintains the last left and right arrangement standard and returns to rearrange to the first lower part 1 line (i.e., the second display area).

Figure 11A:
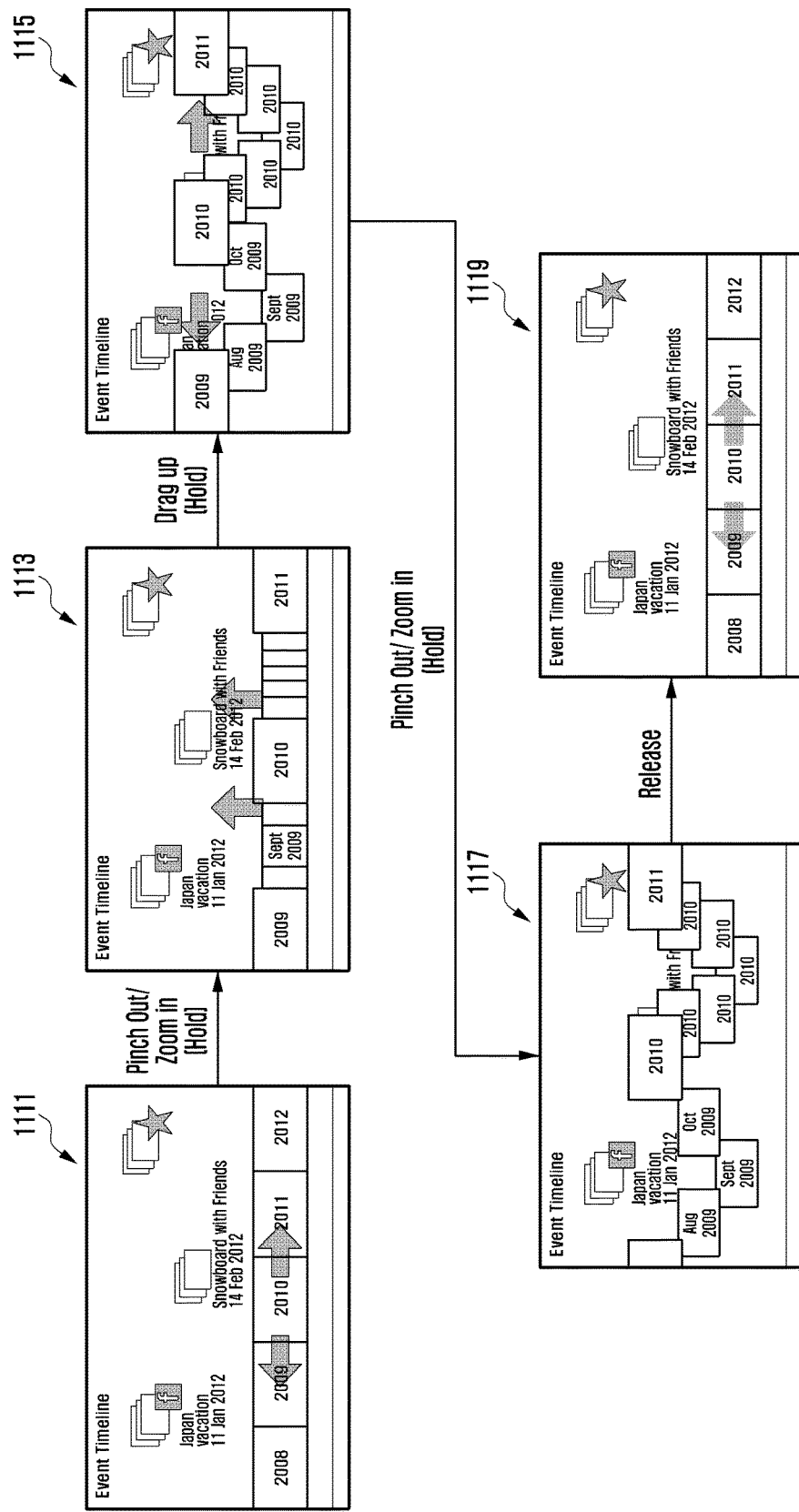

FIGS. 11A to 11E illustrate examples of information displayed according to an embodiment of the present invention 9B. Specifically, FIG. 11A illustrates an information display example of an event timeline.

Referring to FIG. 11A, in screen 1111, folders are displayed on the first display area, and information (event timeline information) according to the timeline is displayed on the second display area. When performing the pinch out/zoom in, the information are expanded horizontally (expanded to left and right) to both directions on the second display area as illustrated in screen 1113. When dragging up is performed, the information is expanded to the first display area as illustrated in screen 1115. The information is expanded and displayed in the horizontal direction in screen 1117, when performing the pinch out/zoom in again. In addition, when the user releases the touch interaction displayed in screen 1117, the controller 100 displays as its original information form in screen 1119.

Figure 11B:
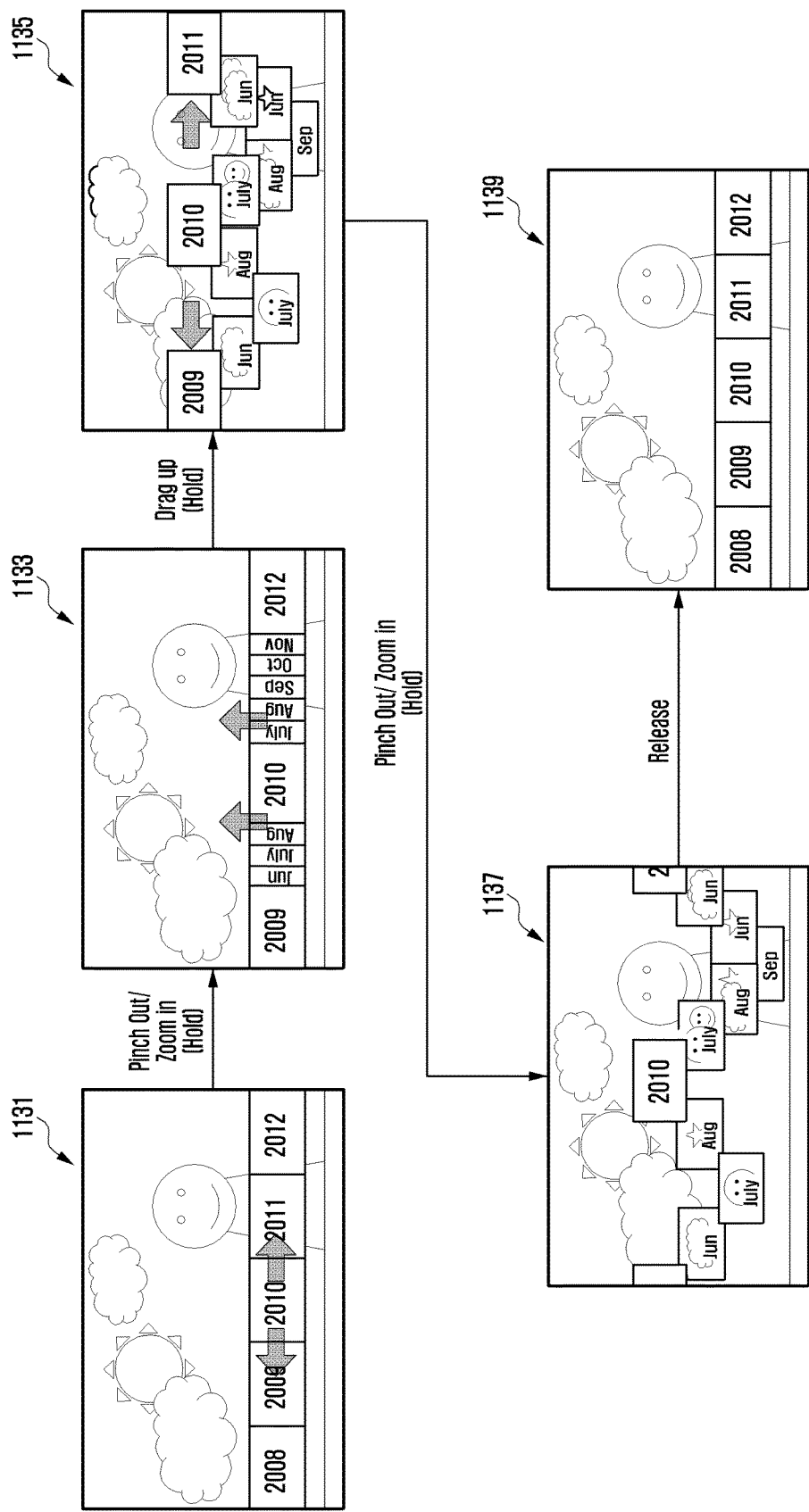
Figure 11C:
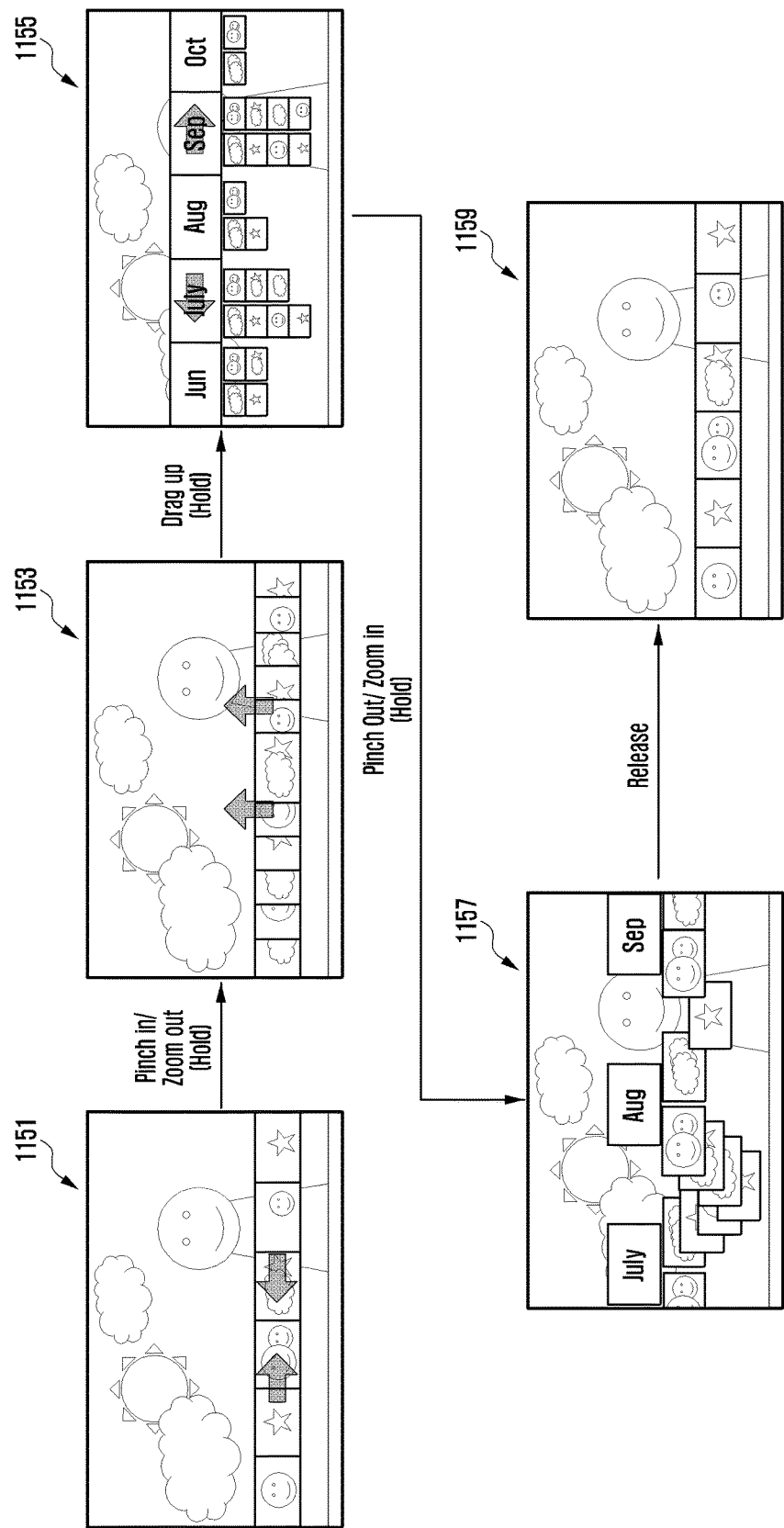

FIGS. 11B and 11C are diagrams illustrating an example of the information display of a gallery which stores a photo image.

Referring to FIGS. 11B and 11C, when performing the pinch out/zoom in operation on screen 1131, the information is expanded and displayed in the horizontal direction in screen 1133 in FIG. 11B, and when performing the pinch in/zoom out operation on screen 1151, the information is displayed while narrowing (reducing or overlapping) in the horizontal direction in screen 1153 in FIG. 11C. When dragging up, the information is displayed in screen 1135 in FIG. 11B, and is displayed in screen 1155 in FIG. 11C. When performing the pinch operations again, the information is displayed in screens 1137 and 1157, until a release detected and screens 1139 and 1159 are displayed.

Figure 11E:
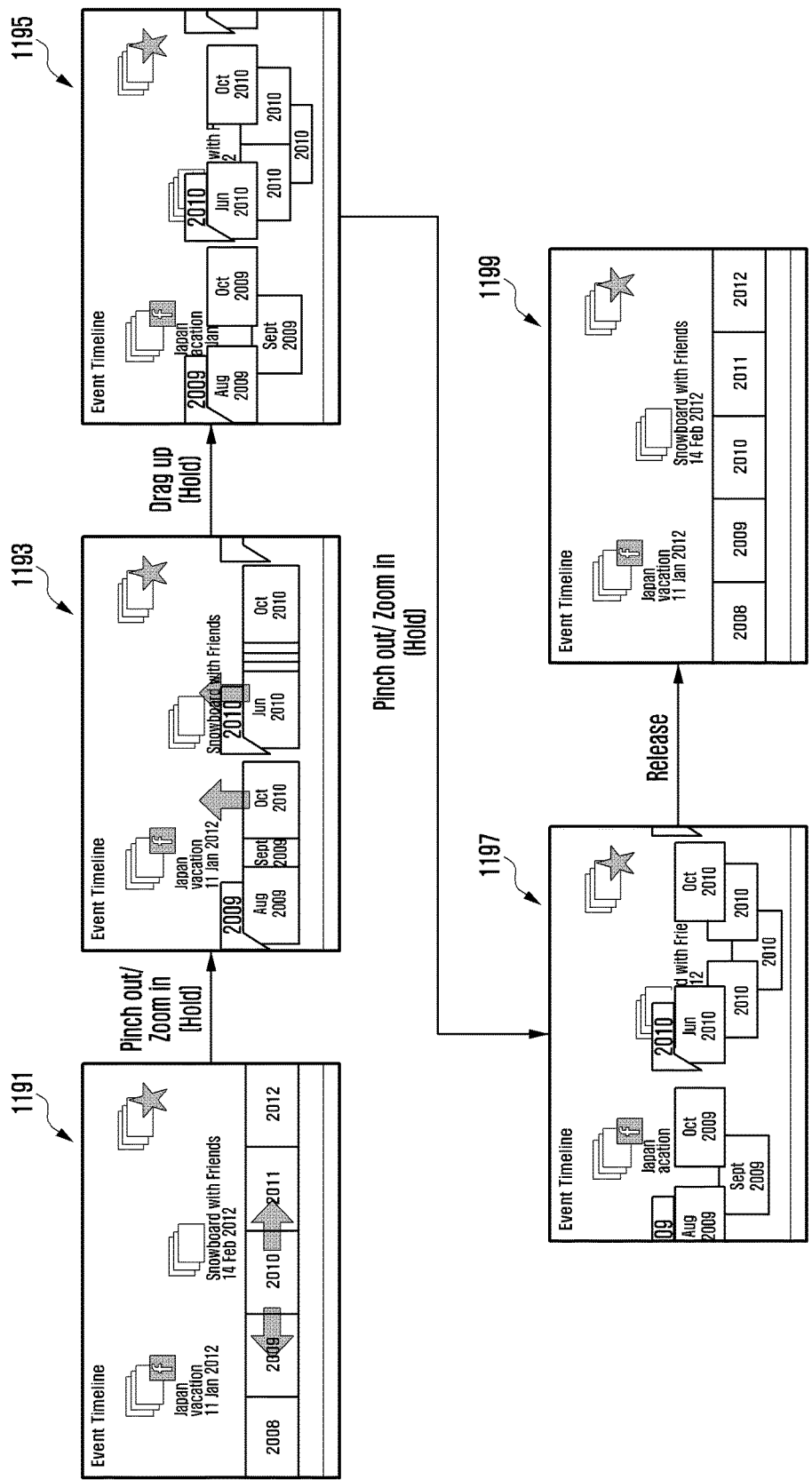

Further, FIGS. 11D and 11E illustrate more examples of performing the pinch zoom in/out and the drag up/down.

Referring to FIGS. 11D and 11E, when performing the pinch out/zoom in operation on screens 1171 and 1191, the information is expanded and displayed in the horizontal direction in screens 1173 and 1193. When dragging up, the information is displayed in screens 1175 and 1195. When performing the pinch operations again, the information is displayed in screens 1177 and 1197, until a release detected and screens 1179 and 1199 are displayed.

Figure 12:
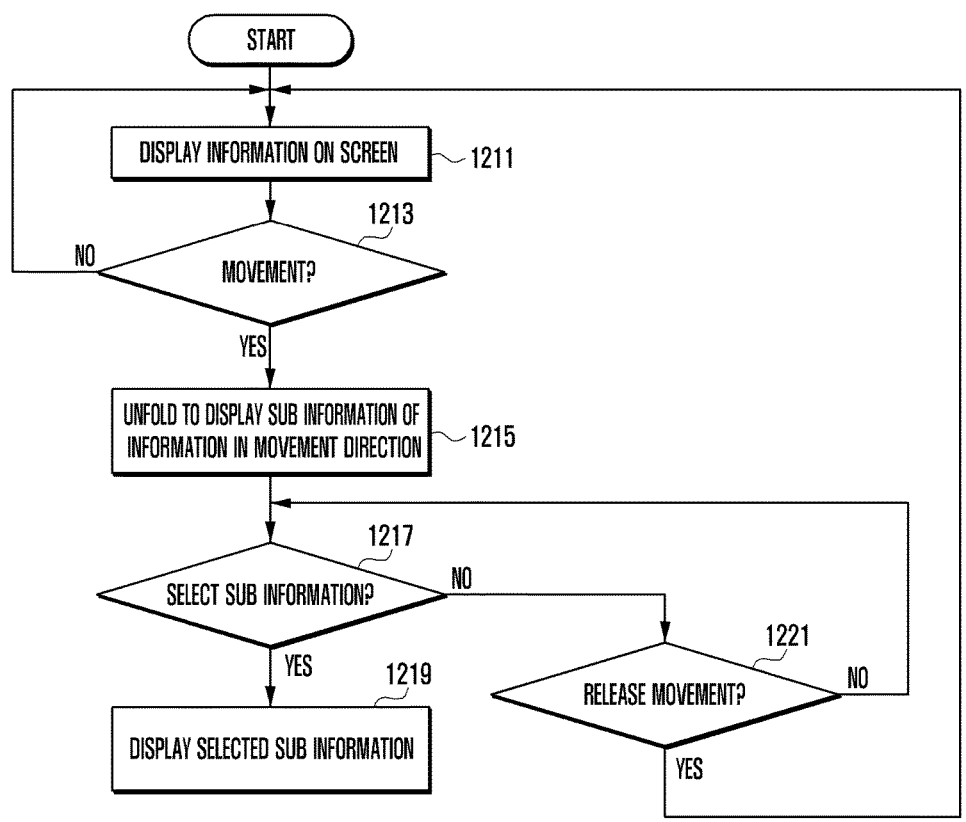
FIG. 12 is a flowchart illustrating a method for displaying information in a portable terminal according to an embodiment of the present invention.

FIG. 12 is a flowchart illustrating a method for displaying information in a portable terminal according to an embodiment of the present invention.

Referring to FIG. 12, the controller 100 displays information (e.g., at least one folder) on the display unit 130 in step 1211. Here, the folder may have a plurality of sub folders. Therefore, when performing the touch interaction by selecting a folder having the sub folders, the folder is unfolded and displayed according to the touch interaction direction.

When the controller 100 detects a touch interaction for moving the information display is generated while displaying the folders on the display unit 130 in step 1213, the controller 100 unfolds (or narrows) and displays the sub folder of the selected folder or the thumbnail content in step 1215. Here, the sub folder and the thumbnail content may be information.

When the controller 100 detects a touch is made again to perform the touch interaction within the set time after the touch is released, the controller 100 processes as the continuous touch interaction, and therefore, the user may unfold (or narrow) and display the information with a desired distance (i.e., a horizontal movement distance) by the touch interaction, and also controls to display a height (i.e., a vertical movement distance) of the information.

When the controller 100 a user selection of the sub information in step 1217, the controller 100 displays the selected sub information on the display unit in step 1219. At this time, the selection method of the information may maintain a holding state during a certain period of time when unfolding and displaying the sub information, or may touch to select the desired information.

When the controller 100 detects the user termination of the touch interaction (a touch release) in step 1221, the controller 100 reverts to the original information display state by returning to step 1211.

Figure 13A:
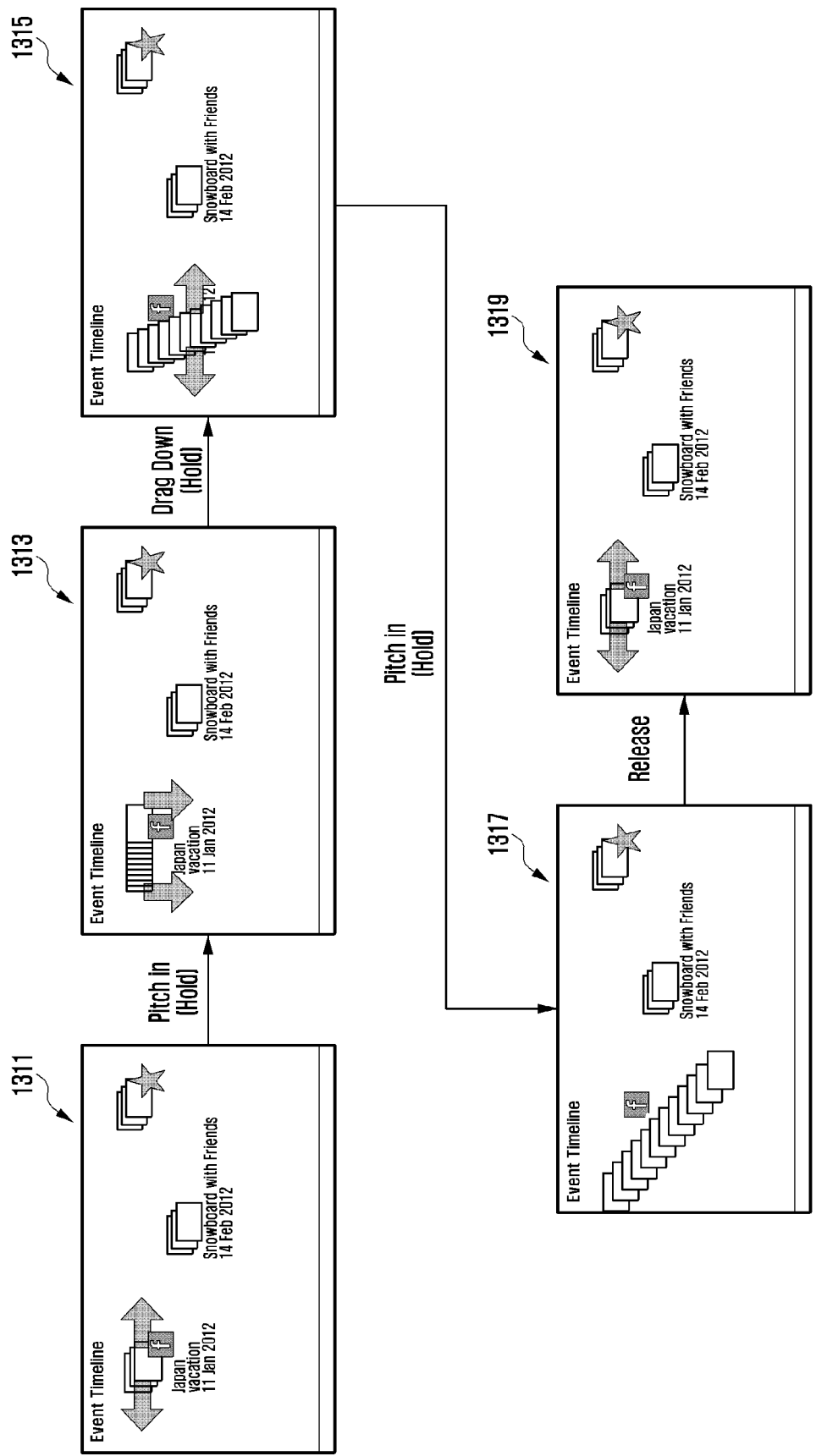
FIGS. 13A and 13B illustrate examples of information displayed according to an embodiment of the present invention.
Figure 13B:
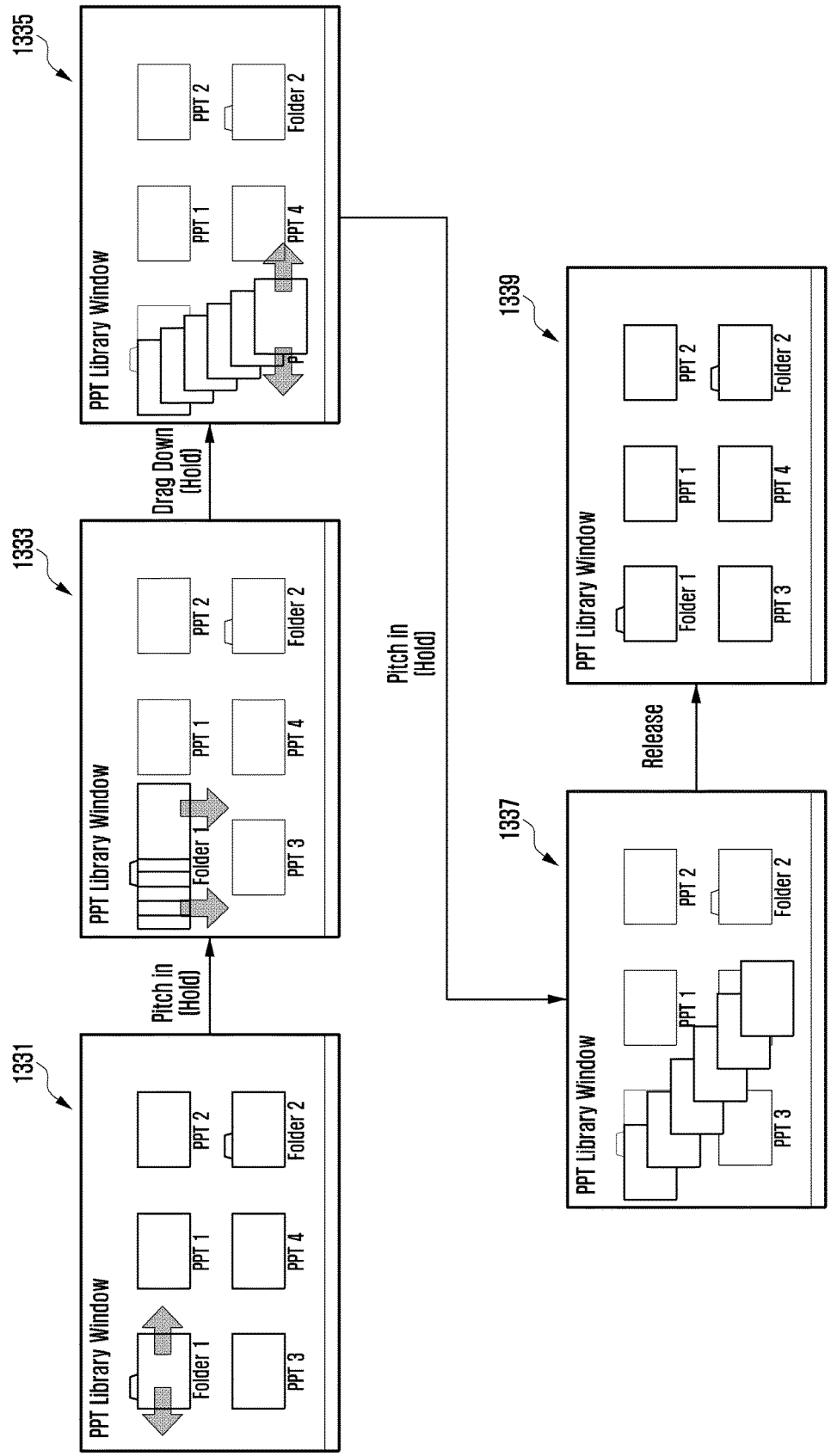

FIGS. 13A and 13B illustrate examples of information displayed according to an embodiment of the present invention. Specifically, FIG. 13A illustrates an example of displaying a thumbnail folder (information) of an event timeline according to an embodiment of the present invention.

Referring to FIG. 13A, in screen 1311, the folders are displayed on the display unit 130. In screen 1313, when performing a pinch zoom in at a specific folder position, the information of the selected folder is horizontally unfolded (unfolds to left and right) to both directions. In screen 1315, when performing a drag up or down, the information is unfolded and displayed to the drag direction.

In screens 1313 and 1315, since a position of the folder is positioned on the upper part of the display unit 130, it is described as an example of dragging down.

In screen 1317, when performing a pinch zoom in again, the information is expanded and displayed to the horizontal direction. When the user terminates (releases) the touch interaction, the controller 100 displays its original information form in screen 1319.

FIG. 13B illustrates another example of displaying a thumbnail folder of a document folder according to an embodiment of the present invention. In FIG. 13B, screens 1331 to 1339 are generated by the same method as described for FIG. 13A.

As described above, the present invention separates and provides an expression of the information corresponding to four directions through four-direction operation for the multiple information within a limited screen size of a portable device. Accordingly, it is more convenient for a user to perform an effective user-centered information expression by selecting an effective amount of the information and a sorting scheme required by the user. For example, within the limited screen, Pinch Zoom In/Out may only distinguish an amount of the information with one-dimensional information variable corresponding to left and right, or to up and down. However, at this time, the user is able to select a writing method which may determine an amount of the information and the information content by moving a multi touch being recognized and rearranging the information in two-dimension, or three-dimension. In addition, an interval and a distance are controlled simultaneously at the time of multi touch, and accordingly, an emotional usability can be provided through an corresponding aesthetic and intuitive expression of four-direction.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for displaying information on a portable device, the method comprising:
   displaying content on a first display area of a display unit;
   displaying, on a second display area, information related to the content on the first display area;
   selecting information corresponding to pinch input in response to detecting the pinch input on the displayed information;
   displaying sub information of the selected information based on a movement distance and a movement direction of a first pinch gesture in response to detecting the first pinch gesture: and
   moving and displaying the sub information based on a movement distance and a movement direction of a second pinch gesture in response to detecting the second pinch gesture,
   wherein the movement direction of the second pinch gesture is perpendicular to the movement direction of the first pinch gesture.

2. The method of claim 1, further comprising:
   terminating displaying of the sub information, upon detection of a release of the second pinch gesture.

3. The method of claim 1, wherein displaying the sub information comprises;
   unfolding the sub information horizontally according to the movement distance in the movement direction, when the first pinch gesture is a horizontal movement; or
   unfolding the sub information vertically in the movement direction according to the movement distance, when the first pinch gesture is a vertical movement.

4. The method of claim 3, wherein the horizontal movement of the first pinch gesture is a pinch zoom in or out, and the sub information is unfolded in two horizontal directions, based on the movement distance, or the sub information is narrowed in the two horizontal directions based on the movement distance.

5. The method of claim 3, wherein the vertical movement of the first pinch gesture is a drag up or down.

6. The method of claim 1, wherein the content includes an eBook, and the sub information includes at least one of a chapter and page information.

7. The method of claim 1, wherein the content includes a photo image, and the sub information includes a photo folder of a gallery folder.

8. The method of claim 1, wherein the content includes a folder image, and the sub information includes a sub folder of the folder.

9. An apparatus for displaying information on a portable device, the apparatus comprising:
   a display unit configured to display content on a first display area, and display , on a second display area, information related to the content on the first display area;
   an input unit configured to receive a touch interaction; and
   a controller configured to:
      select information corresponding to a pinch input in response to detecting the pinch input on the displayed information,
      display sub information of the selected information based on a movement distance and a movement direction of a first pinch gesture in response to detecting the first pinch gesture, and
      control the sub information to move based on a movement distance and a movement direction of a second pinch gesture in response to detecting the second pinch gesture,
      wherein the movement direction of the second pinch gesture is perpendicular from the movement direction of the first pinch gesture.

10. The apparatus of claim 9, wherein the controller is further configured to:
    control the sub information to unfold horizontally in the movement direction, according to movement distance, when the first pinch gesture is a horizontal movement, or
    control the sub information to unfold vertically in the movement direction, according to the movement direction, when the first pinch gesture is a vertical movement.

11. The apparatus of claim 10, wherein the horizontal movement of the first pinch gesture includes a pinch zoom in or out, and
    wherein the controller is further configured to control the sub information to unfold in two horizontal directions, based on the movement distance, or control the sub information to narrow in the two horizontal directions, based on the movement distance.

12. The apparatus of claim 10, wherein the vertical movement of the first pinch gesture includes a drag up or down.

13. A method of displaying information on a portable device, the method comprising;
    displaying one or more folder images on a display unit;
    selecting a folder corresponding to a pinch input in response to detecting the pinch input on the folder;
    displaying sub-folders of the folder based on a movement distance and a movement direction of a pinch gesture in response to detecting the pinch gesture; and
    terminating displaying of the sub information, upon detection of a release of the pinch gesture.

* * * * *